June 17, 1930.  J. F. MULLANEY  1,764,521
CHECK VALVE
Filed Jan. 2, 1925
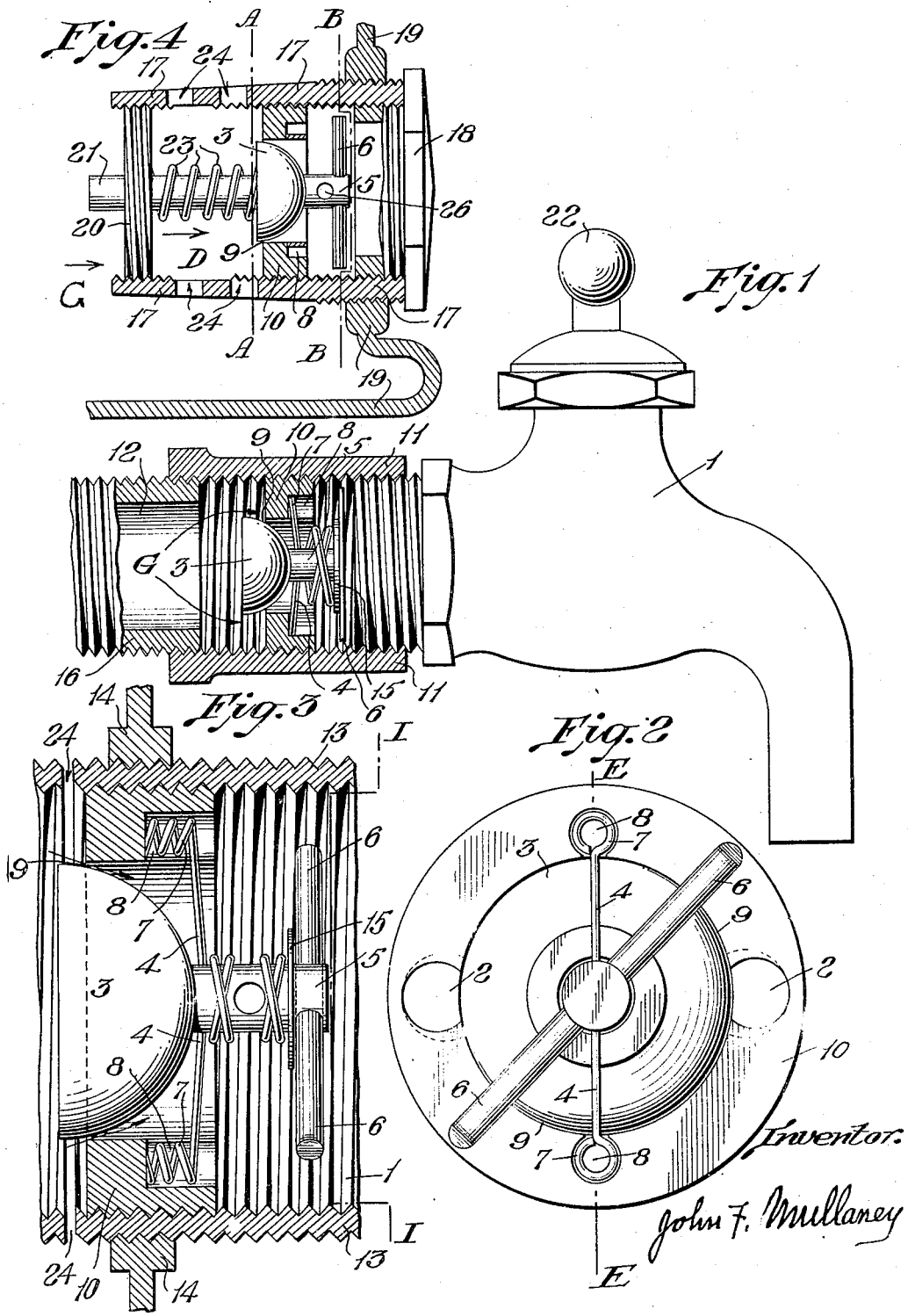

Patented June 17, 1930

1,764,521

UNITED STATES PATENT OFFICE

JOHN F. MULLANEY, OF COLORADO SPRINGS, COLORADO

CHECK VALVE

Application filed January 2, 1925. Serial No. 48.

My invention relates to an improved automatic-acting, check valve adapted to be entered into the outlet end of an outlet tube before connecting the faucet or plug, as in a barrel, tank, hose coupling, or supply pipe to a water faucet; and some of the objects of my invention are, first, to provide a convenient check valve to the outlet pipes or tubes in which water faucets are used, and having it small enough and so constructed as to be susceptible of being entered into the outlet end of the faucet pipe or coupling and still leave room for the insertion into the end of the same pipe of the threaded end of the faucet, so that the faucet may be removed without the escape of water following it, and without going to the trouble of shutting off the water in the intake supply pipe; second, to provide a check valve that can be inserted into the outlet of an oil barrel or other container so as to prevent spilling in rolling or moving the barrel, though it is not plugged otherwise, and a valve that will be automatically opened on inserting the outlet faucet; third, to provide a very cheap and durable form of check valve for all forms of containers, as barrels or bottles so they will remain closed until some instrument is inserted to force the valve inwardly, as is done by inserting a faucet to draw out the contents, or by inserting a tube to re-fill the container; fourth, to provide means on said check valve so that it may be releasably engaged by a pronged tool for turning said valve mechanism to threadedly insert it or remove it; fifth, to provide means for emptying the last residue of a fluid from a container; sixth, to provide means for precluding the entry of dust or other débris into empty containers while shipping same; seventh, to provide a check valve in the outlet end of sections of pipes or tubes or couplings, so that a nozzle, may be removed and another section of pipe or hose may be workably attached thereon without shutting off the water or other fluid at its intake source; eighth, to provide a check valve that can be easily inserted and removed from the outlet of a pipe or tube for various reasons, as for cleaning it out; ninth, to provide a check valve that can be inserted into the outlet end of the connection of a service pipe without extending the faucet or changing the original plumbing contour.

I attain these objects by means of the mechanisms illustrated in the accompanying drawings, in which,—

Figure 1, is a side view of a common faucet shown as inserted into a common water pipe outlet shown here in section and provided with said check valve; Fig. 2, is a diagrammatic front view of said check valve as shown not connected with any other fixture; Fig. 3, is a sectional view of the valve inserted into the outlet tube in the end of a metal container; Fig. 4, represents a sectional elevation of part of a barrel end 19, and of a form of my check valve inserted into a threadably secured tapered tube 17, inserted into the end or side of a barrel which is plugged at 18 for shipment.

Similar numerals and letters refer to similar parts throughout the several views.

My improved valve assembly comprising the ball-shaped valve 3 and the plunger-stem 5 carrying the cross pin 6, and the closing spring 4 secured in the valve-seat ring 10, as disclosed in Figs. 1, 2 and 3.

In Fig. 1 is shown a common form of faucet 1 inserted into the outlet pipe or tube or coupling 11, which couples the faucet 1 to the supply pipe 12. This coupling or thimble is threaded on the inside, and my check valve has its valve seat ring 10, threaded like the threading on the faucet 1, and can be inserted thereby into the said thimble 11, so as to allow the cross pin 6 to just pass clear within the end of said thimble far enough to allow the faucet to threadably engage the thimble before engaging the cross pin. When the faucet 1 engages the cross pin, 6, it forces the plunger stem 5, toward the opening within the valve seat ring 10, and against the tension of the closing spring 4, and forces the ball-shaped valve 3 away from its seat at 9.

In the act of inserting the check valve into a tube it is necessary to use something similar to a two-pronged tool, inserting the prongs into the recesses 2, 2, of said ring 10, which can then be screwed into the thimble as far as required and can be subsequently adjusted in its relative position within said thimble with the faucet to suit the amount of flow of fluid.

When the faucet 1 engages the cross pin 6, it turns with the faucet and so turns the plunger stem 5, and the valve 3, and would have a tendency to turn the closing spring 4, but that its ends 7 are bent and inserted and secured within the securing recesses 8, 8, and secured from turning thereby. To reduce the friction between said cross pin and said spring I have provided an inserted friction washer 15, between them, which provides a smooth track for the spring to slide on. A thimble similar to 11, can be provided and used for coupling tubular hose, and this check valve may be used therein between sections or at the end so that sections may be attached or removed or nozzles changed without first shutting off the water at its supply end. This check valve when all made of metal is provided to meet the need in oil supply faucets, and also in hot water faucets.

In Fig. 4, the closing spring 23, is spiral and encircles a backwardly extending extension member 21, from valve 3, through a threadably adjustable guide nut 20, which nut is an abutment, pressing spring 23, against valve 3 to close it. The arrows G indicate the courses of the flow of water through openings as at 24, and D, and the flow between valve 3 and its seat is designated at 9.

This appliance is also desirable in a building with many faucets, when it is not convenient to cut out the supply to many faucets to remove but one faucet, as is often the case.

This spring 4, need be only strong enough to throw the weight of the valve, but can be varied in its stiffness by using different sizes of stock or by stretching or compressing, or by inserting the cross pin into different positioned holes in the stem 5, and when the fluid pressure is constant, the spring may be omitted entirely.

In Fig. 3, is shown a section disclosing the said check valve inserted into the outlet pipe or thimble 13 of a container, indicated in part by threaded abutments 14, 14, to represent the wall of the container.

One of the advantages of this check valve, in shipping barrels, as of oil or other fluids, is where the barrel is to be mounted on some convenient pedestal before inserting the faucet.

Where there is no check valve in the container, the faucet must be inserted immediately after removing the plug, and before mounting the container upon the pedestal in position to have the contents flow through the faucet by gravitation. But where the check valve is already inserted, the plug which only protects the check valve, may be left in the container until it is mounted, and then removed and the faucet put into its place, and the inserted faucet opens the check valve and the flow is then controlled by the faucet by opening the handle 22.

One of the objects in having the spring 4, is to hold the valve against its seat while the barrel is rolled over with the valve uppermost, and against gravitation and jolts.

It must be considered that this check valve will seldom be adjusted as compared with the outer or faucet valve. The check valve in Fig. 1, will be operated only when the faucet is removed to repair its valve, and that may be but once in months, while the valve in the faucet may be used hundreds of times in a day.

So the check valve may last a lifetime of service, while the faucet valve may require replacement once a year.

This check valve can be used in a wash bowl faucet, a bath tub connection, a water faucet, in a union or hose coupling, and in many other appliances.

The outside taper of tube 17 provides against its leakage caused by wear on the threads from many removals and insertions while cleaning out residue. The form of valve shown in Fig. 1, can be used also in the tube 17, shown in Fig. 4. The form shown in Fig. 4, allows a more adjustable means of tensioning the closing spring 23, as for use in containers to be shipped. Special tools for inserting tube 17 and valve seat ring 10 are provided to engage recesses 24 and 2 respectively.

I claim—

1. A check valve adapted to be inserted into the outlet of a container, comprising a valve seat ring secured to the inside wall of said outlet, a ball-shaped valve fitted to an annular seat in the back of said ring, a plunger arm secured to the front of said valve and extending forwardly through said ring and adapted to open said valve, a cross member extending transversely of said arm near its end, and a coil spring encircling said arm between said cross member and said ring and having its ends secured in recesses in the face of said ring and adapted to press said cross member and said ring apart expansively and adapted to close said valve against said seat.

2. A check valve adapted to be inserted into the outlet of a container and to be opened by the insertion of a faucet or similar appliance, and said valve comprising the combination of a metal ring secured adjustably to the inner wall of said outlet, and having an annular valve seat formed on the inner back edge of said ring, a ball-shaped valve fitting to said seat, a plunger arm integral with said valve and extending forwardly through said ring and adapted to open said valve by forcing it away from said seat a cross pin extending transversely through said arm near its end and adapted to be engaged by a threadably inserted faucet or similar appliance, a compressed spring encircling said arm between said pin and said ring and having its ends secured into recesses provided in the face of said ring, a thin washer member pressed between said pin and said spring and adapted to reduce friction between them, substantially as set forth.

JOHN F. MULLANEY.